US009047448B2

(12) United States Patent
Tessier et al.

(10) Patent No.: US 9,047,448 B2
(45) Date of Patent: Jun. 2, 2015

(54) BRANCH AUDITING IN A COMPUTER PROGRAM

(71) Applicant: Apple Inc., Cupertino, CA (US)

(72) Inventors: Cedric Tessier, Paris (FR); Daniel Reynaud, San Jose, CA (US); Jean-Baptiste Aviat, Saint-Ouen (FR); Jonathan Gregory McLachlan, San Francisco, CA (US); Julien Lerouge, San Jose, CA (US); Pierre Betouin, Paris (FR)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 13/741,227

(22) Filed: Jan. 14, 2013

(65) Prior Publication Data

US 2014/0201720 A1    Jul. 17, 2014

(51) Int. Cl.
| | |
|---|---|
| *G06F 7/38* | (2006.01) |
| *G06F 9/00* | (2006.01) |
| *G06F 9/44* | (2006.01) |
| *H04L 9/32* | (2006.01) |
| *G06F 11/30* | (2006.01) |
| *G06F 12/14* | (2006.01) |
| *G06F 21/14* | (2013.01) |
| *G06F 21/51* | (2013.01) |

(52) U.S. Cl.
CPC .............. *G06F 21/14* (2013.01); *G06F 21/51* (2013.01); *G06F 2221/2107* (2013.01)

(58) Field of Classification Search
CPC . G06F 21/33; G06F 2221/2145; G06F 8/316; G06F 8/51
See application file for complete search history.

(56) References Cited

U.S. PATENT DOCUMENTS

| | | | | |
|---|---|---|---|---|
| 7,475,428 | B2* | 1/2009 | Smith et al. ...................... | 726/27 |
| 7,543,284 | B2* | 6/2009 | Bolton et al. ................. | 717/157 |
| 7,594,111 | B2 | 9/2009 | Kiriansky et al. | |
| 7,603,704 | B2* | 10/2009 | Bruening et al. .............. | 726/23 |
| 7,620,987 | B2* | 11/2009 | Shelest et al. ................. | 713/189 |
| 7,752,459 | B2 | 7/2010 | Cowan et al. | |
| 7,823,135 | B2 | 10/2010 | Horning et al. | |
| 7,841,009 | B1 | 11/2010 | Smith | |
| 8,056,138 | B2 | 11/2011 | Jin et al. | |
| 8,589,888 | B2* | 11/2013 | Cui et al. ...................... | 717/125 |
| 8,621,626 | B2* | 12/2013 | Alme ............................ | 713/194 |
| 2005/0010804 | A1* | 1/2005 | Bruening et al. ............. | 713/200 |
| 2005/0262347 | A1* | 11/2005 | Sato et al. ..................... | 713/176 |
| 2006/0020789 | A1* | 1/2006 | Gipps et al. ................... | 713/167 |
| 2007/0028307 | A1* | 2/2007 | Murison et al. ................. | 726/27 |
| 2008/0256346 | A1* | 10/2008 | Lee et al. ....................... | 712/233 |
| 2008/0301635 | A1* | 12/2008 | Khan ............................. | 717/116 |
| 2009/0271771 | A1* | 10/2009 | Fallows ........................ | 717/137 |
| 2010/0058256 | A1* | 3/2010 | El-Zein et al. ................. | 716/18 |

* cited by examiner

*Primary Examiner* — Don Wong
*Assistant Examiner* — Anibal Rivera
(74) *Attorney, Agent, or Firm* — Blakely, Sokoloff, Taylor & Zafman LLP

(57) ABSTRACT

A branch auditing system can be automatically injected into a computer program, in one embodiment, in response to a programming call provided in source code by a programmer who has selected a particular branch, in a set of possible branches, for auditing. The branch auditing system can record, in an obfuscated data structure, a path taken at the particular branch and the parameters associated with the branch and later an auditor can determine whether the path taken was valid, and if the path taken was invalid, operations can be performed to protect the program, system and/or user.

17 Claims, 5 Drawing Sheets

BRANCH AUDITING IN A COMPUTER PROGRAM

BACKGROUND OF THE INVENTION

The present invention relates to techniques for protecting computer programs, and particularly to techniques for protecting computer programs from reverse engineering.

A reverse engineer will typically attack a computer program from at least one of two ways. The reverse engineer can attempt to inspect and/or modify the data used by the computer program in order to force the program to do or to achieve the result desired by the reverse engineer. Alternatively, the reverse engineer can attempt to attack the program by attacking the control flow of the program. Computer programs use conventional control flow techniques, such as IF statements, conditional jumps etc. in order to cause the program to go or operate in a certain flow. The control flow of the computer program is typically specified by branches, and at each branch the flow can go in at least one of two directions depending upon the instructions in the computer program at a particular branch. Reverse engineers will attempt to hijack a branching control flow instruction in order to cause the program to achieve a result desired by the reverse engineer. For example, if the computer program is a program that provides digital rights management and is protecting a digital asset, such as a movie, a reverse engineer can attempt to hijack a branch control flow instruction to try to force the program to give access to the reverse engineer in order to allow the reverse engineer access to the digital asset or to allow the reverse engineer to take control of the program. For example, the reverse engineer can attempt to hijack a conditional jump that determines whether or not a signature during a handshake is valid or not or a conditional jump that determines whether a digital certificate is valid or not. Traditional methods for protecting branching control flow instructions involve verifying the instructions themselves have not been tampered with or the data in the comparison (used in the branch) have not been tampered with. One problem with these approaches to protect branches is that once a jump has occurred, a reverse engineer who has hijacked the program can undo the changes made, such as replacing the reverse engineer's corrupted data with correct data, and then the maliciously hijacked path will go undetected. U.S. Pat. No. 7,594,111 provides an example of techniques used in the past to protect computer programs from such reverse engineering attacks. Also see U.S. Pat. Nos. 8,056,138; 7,823,135; 7,620,987; and 7,841,009.

SUMMARY OF THE DESCRIPTION

Methods and systems for detecting that a computer program has been attacked by a reverse engineer can use, in one embodiment, a compiler injected branch auditor which audits the path taken at a selected branch in the control flow of the computer program. In one embodiment, a programmer can select one or more branches, out of a set of branches, for auditing by, in one embodiment, inserting a call through an API (application programming interface) to invoke branch auditing for the programmer's selected branches. Thus, the programmer's source code specifies a request for branch auditing and also specifies the one or more selected branches, which will be typically a subset of the branches in the computer program. These selected branches can be chosen by the programmer based upon their value or importance in maintaining security in the program. For example, the programmer can select a branch involved in device or user authentication (such as a branch that determines whether a signature or a handshake is valid or not or a branch which determines whether a user's inputted password is valid, etc.) In one embodiment, a compiler, when compiling the source code, recognizes the branch auditing call inserted by the programmer and automatically injects branch auditing instructions into the final executable code of the computer program in order to audit the selected branch that had been specified (directly or indirectly) by the call. In one embodiment, the compiler injected instructions will cause the computer program, when it is executing, to record the path taken for the selected branch and to record the parameters associated with the selected branch. The parameters associated with the branch can be in one embodiment those values or variables used in determining the path to take at the branch and the operations to use on those values and/or variables to select the path. The operations can be characterized as comparison operations (such as, equal to, or not equal to, or greater than, or lesser than, or greater than or equal to, or lesser than or equal to, etc.) which use the values and/or variables to select the path. In one embodiment, the operations can be defined by a comparison type.

In one embodiment, the compiler injected instructions can store the path taken at the branch and the parameters associated with the branch in an obfuscated audit data structure. The obfuscated audit data structure can use some form of encryption to hide the stored values and the comparison type that represent the path taken and the parameters used in the comparison. The compiler injected instructions can also include executable code that implements a branch auditor that has access to the obfuscated audit data structure and is capable of decrypting the obfuscated and/or encrypted values that represent the path taken and the parameters associated with the branch. The branch auditor can determine whether the path taken was valid given the stored path taken and the parameters by performing the comparison specified in the parameters using the saved values specified in the parameters. This comparison can be performed asynchronously relative to the branch being audited, in one embodiment, in order to decouple the auditing with the particular branch; this asynchronous behavior can make it very difficult for a reverse engineer to associate the branch auditor's detection of the hijacking with the particular branch being audited since the two events are separated by both time and space (in the sense of computer instructions separating the branch from the auditing instructions). If this comparison performed by the branch auditor shows that the path taken was valid, then no action is needed, but if this comparison by the branch auditor indicates that the path taken was not valid, then the compiler injected code can perform one or more operations to secure the program or the data processing system that is executing the program.

In one embodiment, the operations performed to secure the system can include: causing the computer program to stop executing thereby terminating or killing the program; causing the computer program to report an error to the developer of the program and/or to the user of the program; causing the computer program to corrupt or erase data, such as encryption keys or decryption keys; causing the computer program to operate in a safe manner (such as refusing to allow the user to engage in financial transactions or otherwise restricting operation of the computer program to a predefined safe mode); or causing the computer program to take other actions deemed by the developer to make the system secure relative to the hijacked computer program, etc.

The operations of the branch auditor can be performed in ways which appear disconnected from the event of the path being taken; this disconnect can make it difficult for a reverse engineer to discover the auditing of particular branches. For example, the branch auditor can be invoked randomly in time rather than being invoked immediately after a path is taken from a branch that has been selected for auditing. In another embodiment, the branch auditor can be invoked after a predetermined period of time after the path was taken. In other embodiments, the branch auditor can be invoked after a selected number of audited branches have been traversed.

The present invention includes systems which can perform one or more methods described herein and also includes machine readable non-transitory storage media which contain computer program instructions which when executed cause a data processing system to perform one or more of the methods described herein.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In one embodiment, a compiler injected branch auditor audits the path taken at a selected branch in the control flow of the computer program. In one embodiment, a programmer can select one or more branches, out of a larger set of branches, for auditing by, in one embodiment, inserting a call to an application programming interface (API) to invoke branch auditing for the programmer's selected branch. Thus, the programmer's source code can specify a request for branch auditing and also specify the one or more selected branches through the API. Typically, the source code can have a large number of branches and the programmer select only a few of those for auditing. In one embodiment, the branches can be selected based upon their value or importance in maintaining the security of the computer program.

Figure 1:
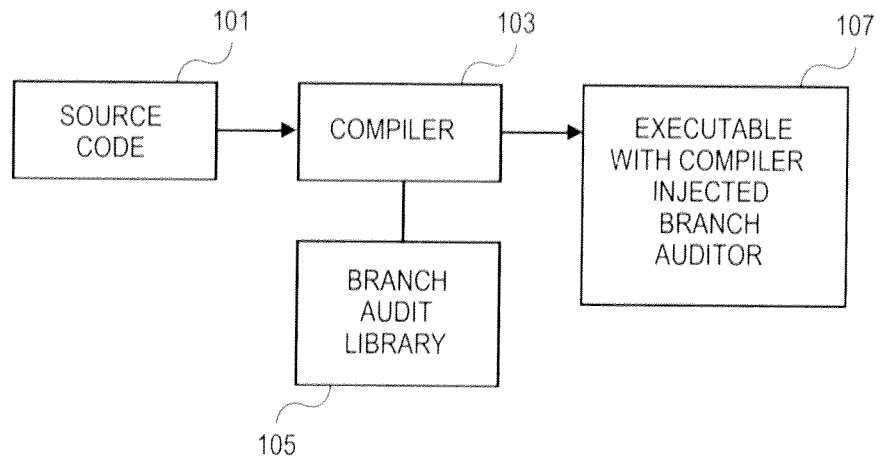
FIG. 1 illustrates how a compiler can operate according to one embodiment of the present invention.

FIG. 1 shows an example of how a compiler can perform one or more of the methods described herein. Compiler 103 can receive a source code 101 which includes many conventional computer program instructions which include conventional branches, such as conditional jumps, etc. A programmer who authors source code 101 can also insert, in one embodiment, calls through an API to invoke branch auditing of branches selected by the human programmer. Thus, source code 101 would include conventional computer program instructions including a variety of branches as well as selected branches and the call inserted by the human programmer into the source code; the inserted call can specify selected branches (and only those selected branches out of a set of many more branches) for auditing. Compiler 103 in the process of compiling the source code into executable code, such as executable code 107, can use a branch audit library 105 to create and insert instructions to capture branch information and to also insert instructions to create a branch auditor which uses the captured branch information in order to determine whether or not the path taken was valid. The result of compiler 103's operations produces the executable computer program 107 which includes compiler injected branch capture routines as well as compiler injected branch auditor routines. In one embodiment, compiler 103 can be considered to include pre-processing and post-processing software in order to create the final executable program 107.

Figure 2:
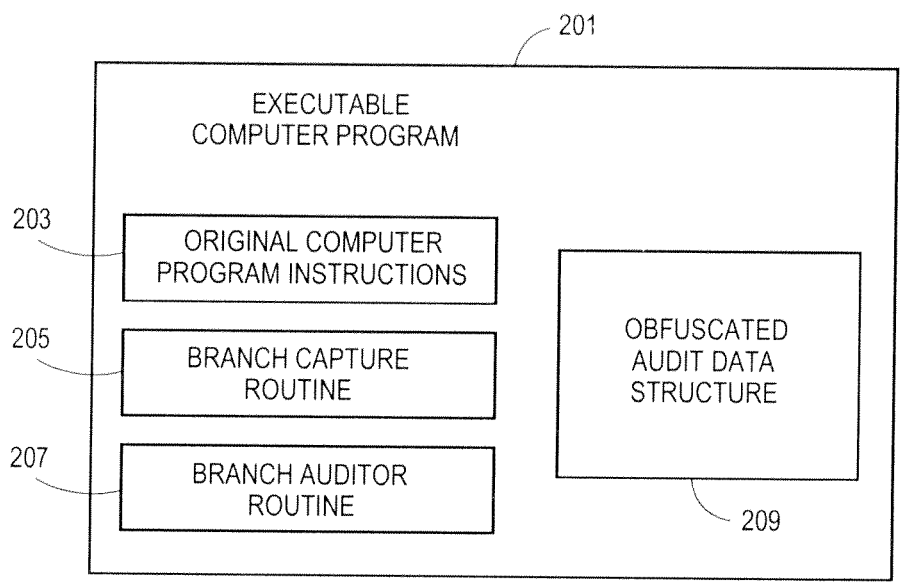
FIG. 2 shows an example of a machine readable non-transitory storage medium containing an example of a compiled computer program according to one embodiment of the present invention.

FIG. 2 shows an example of a machine readable non-transitory storage medium 201 which includes an executable computer program 203, 205, and 207 which can be the same as computer program 107 shown in FIG. 1. The medium 201 includes, in addition to the executable computer program, an obfuscated audit data structure 209 which contains stored information which was captured by branch capture routine 205, and this information will be used by the branch auditor routine 207 in order to audit whether the audited branch has been hijacked or not. In one embodiment the obfuscated audit data structure 209 can store captured branch information from one branch or from a plurality of branches which were being audited by the branch auditor routine 207. In one embodiment, there may be multiple instances of the branch capture routine 205, one for each selected branch which has been selected by the human programmer for branch auditing. At the same time, a single instance of the branch auditor routine 207 can be invoked to audit each of those branches having data stored in the obfuscated audit data structure 209. The executable computer program stored in the medium 201 will also include the original computer program instructions 203 which were compiled from the human programmer's source code, such as source code 101. It will be appreciated that the computer programmer's instructions 203 can have many thousands of branches and out of those thousands a programmer may select only one or a few selected branches for auditing rather than selecting all of the branches for auditing.

Figure 3:
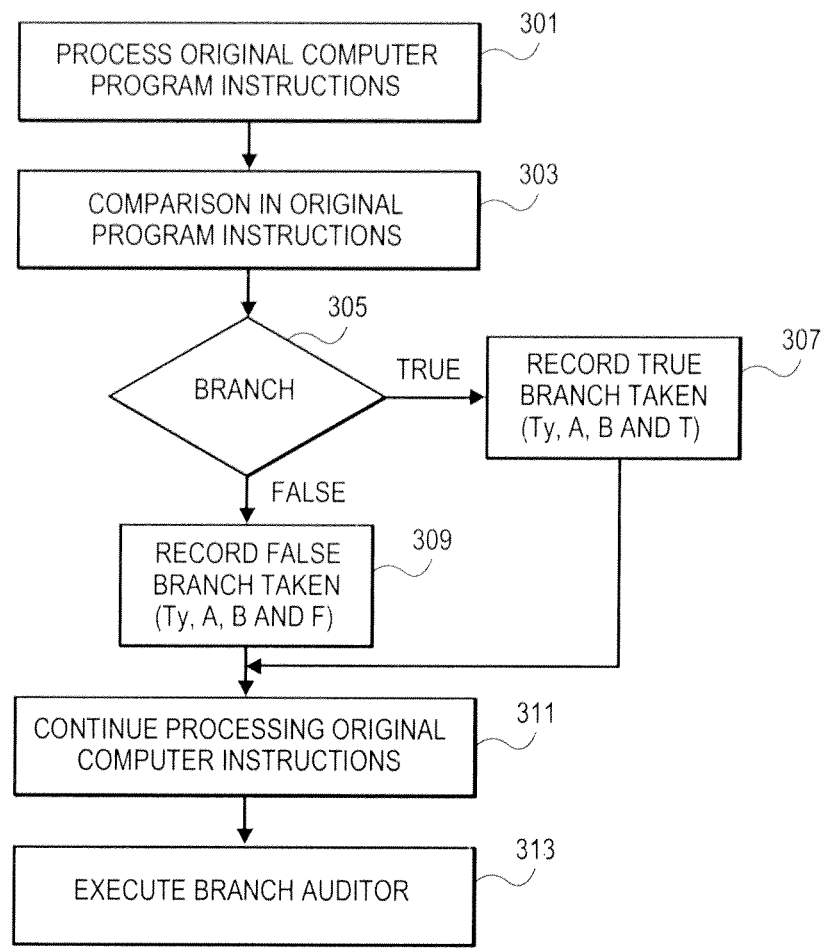
FIG. 3 is a flowchart which illustrates an example of a method for capturing the state of an executing program at a branch according to one embodiment of the present invention.

FIG. 3 shows an example of a method which can be performed by the branch capture routine 205 for a branch which has been selected for auditing. The selection for auditing can be by way of a programming call through an API by a human programmer. The branch capture routine 205 can, in one embodiment, perform the method shown in FIG. 3 each time the selected branch is traversed in the control flow of the computer program. Thus, the method shown in FIG. 3 can be performed repeatedly over time for the same branch. The method in FIG. 3 can begin in operation 301 in which the data processing system is processing the original computer program instructions which include the selected branch. In operation 303, the computer program performs the comparison at a branch and in operation 305 the computer program takes a particular selected path; in one embodiment, the branch can have two possible paths one of which can be labeled as "true" and the other of which can be labeled as "false". For example, if the comparison at the branch is "does A=B?" and A does equal B then the path taken at the branch is "true" because the comparison's result is true. If the true branch is taken then the compiler injected branch capture routine will record in operation 307 the fact that the true branch ("T") was taken and will also record or store parameters associated with the selected branch. In one embodiment, these parameters can be a comparison type (Ty) which specifies the comparison used in the branch as well as the values used in that comparison (values A,B). The comparison type can be one of a variety of different possible comparison types including, for example, equal to, not equal to, or greater than, or lesser than, or greater than or equal to, or lesser than or equal to, etc. If the branch 305 resulted in the false branch being taken, then the compiler injected code which creates the branch capture routine 205 records in operation 309 the fact that a false branch ("F") was taken and also stores or records the comparison type (Ty) as well as the values used in the comparison (A,B) and also records or stores these items in an audit data structure. From either operation 307 or 309 processing continues in operation 311 in which the computer program continues to process the original computer instructions created from the programmer's source code, such as source code 101. At some point, the method of FIG. 3 can be completed by executing a branch auditor in operation 313; this branch auditor can be, for example, the branch auditor routine 207 shown in FIG. 2. The branch auditor routine can be invoked in one embodiment immediately after the branch capture routine has captured information about the branch that was taken in either operation 307 or 309.

In another embodiment, the branch auditor routine can be invoked asynchronously relative to branch 305. For example, if the branch auditor routine is invoked randomly relative to operation 305 in either time or in a number of instructions after branch 305, then it can become difficult for a reverse engineer to correlate the auditing operation with a particular branch that was selected for auditing. The randomness can be based upon either time or a number of instructions since the selected branch was traversed. In another embodiment, the branch auditing instruction can be invoked based upon a predefined number of audited branches having been traversed in conjunction with other parameters, such as a random time or random number of instructions after the last audited branch was traversed. In one embodiment, the invoking of the branch auditor can be random in time but with a cap or limit in the amount of time which can lapse before the branch auditor is invoked. Similarly, if the number of instructions are used to determine when to invoke a branch auditor, then the number of instructions can be random but limited by a maximum value to ensure that the branch auditor is invoked at some point.

Figure 4:
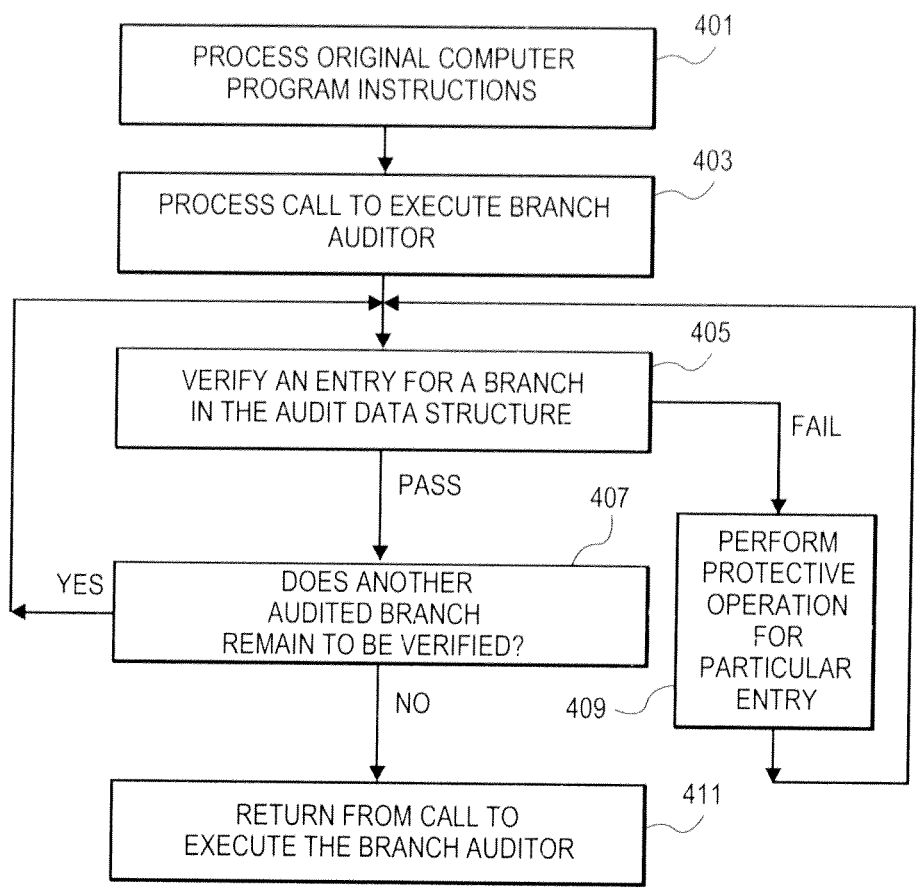
FIG. 4 is a flowchart which illustrates a method of one embodiment for auditing a branch after data from the branch has been captured.

FIG. 4 shows an example of a method to use a branch auditor routine, such as branch auditor routine 207. In operation 401, the original computer program instructions are processed as they normally would be processed until operation 403 in which the branch auditor routine, such as branch auditor routine 207, is invoked in one or more of the manners described herein. For example, the branch auditor routine could be invoked randomly in time relative to the time of execution of the particular selected branch which has been audited. After being called to execute the branch auditor routine, the system in operation 405 verifies an entry for a branch in the audit data structure, which can be, in one embodiment, the obfuscated audit data structure 209 shown in FIG. 2. In one embodiment, the branch auditor routine retrieves the comparison type for the branch and the values A and B and the stored path for the branch taken (for example true or false recorded in either operation 307 or 309 shown in FIG. 3). The branch auditor routine then performs the comparison again using the saved values (such as values A and B) and the comparison type (Ty) to determine whether or not the branch should have been true or false. If the result from the comparison shows that the branch stored was the correct branch based upon the verification operation in 405, then the branch auditor indicates that the branch taken was valid in which case the system can provide a pass indicator for that branch, allowing the system to proceed to operation 407 in FIG. 4. In operation 407, the system determines whether another audited branch remains to be verified and returns back to operation 405 if other audited branches remain to be verified. If no further audited branches remain to be verified then the system in operation 411 can return from a call to execute the branch auditor to continue processing the computer program instructions in the program.

If the branch auditor routine in operation 405 concludes that the branch taken was invalid based upon the stored comparison type and the stored values used for that comparison type, then the system concludes that the program appears to be hijacked and would perform one or more operations, in operation 409, which are designed to protect the user or the computer program of the data processing system from the hijacked computer program. The protective operation in operation 409 can include any one or more of a plurality of options including: causing the computer program to stop executing, as in quitting or terminating the computer program; causing the computer program to report an error to the developer of the computer program (such as, for example, establishing a connection over the Internet with the developer to communicate the error) and/or to the user of the computer program; causing the computer program to corrupt or erase data, such as encryption keys or decryption keys used in a digital rights management computer program; causing the computer program to operate in a safe manner, such as refusing to allow the user to engage in financial transactions; or causing the computer program to take other actions deemed by the developer or creator of the program to make the system secure relative to the hijacked computer program. The method shown in FIG. 4 can be performed for one branch at a time or for a plurality of branches at a time depending on how the branch auditor routine is invoked. In one embodiment, the obfuscated audit data structure 209 can include stored data for a plurality of branches which have been accumulated as the computer program executes over time, and at some point the branch auditor routine is invoked and can process all of the audit data in the obfuscated audit data structure 209 or a selected portion of that audit data.

Figure 5:
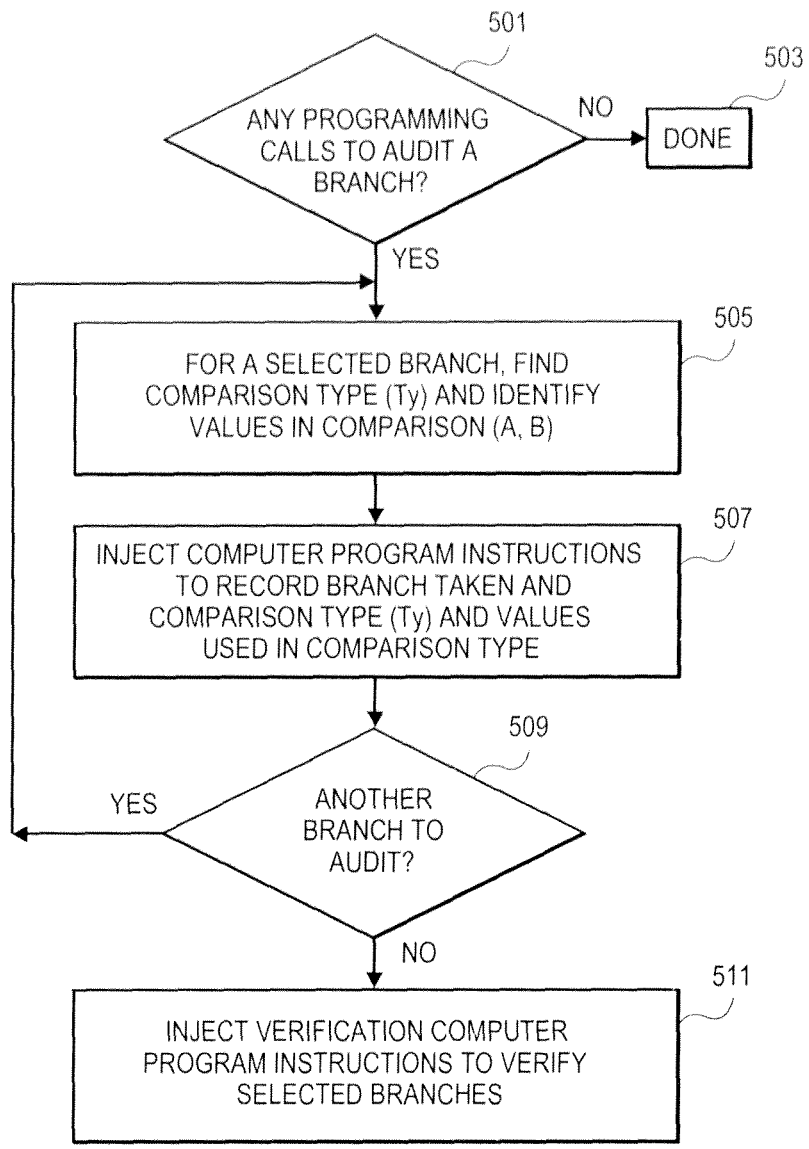
FIG. 5 is a flowchart which illustrates a method which can be performed by a compiler, such as the compiler shown in FIG. 1, according to one embodiment of the present invention.

FIG. 5 shows an example of a method according to one embodiment in which a compiler, such as compiler 103, injects computer program instructions to record branch parameters for branch auditing and also injects computer program instructions to provide for a branch auditor routine or a set of branch auditor routines to audit the information recorded by the instructions which have captured data from one or more selected branches. In operation 501, the compiler determines whether or not there are any programming calls to audit one or more branches in the computer program. The computer program can be the source code 101 which is being processed by the compiler 103 which is performing the method shown in FIG. 5. The programming calls detected in operation 501 can be a specific programming call having a specific format and syntax specified by an exposed API. In one embodiment, if any such programming call exists, then operation 501 proceeds to operation 505. If no such programming calls exist, then the compiler exits in operation 503 from the process of creating branch auditing software. In operation 505, the compiler identifies, for a selected branch which has been selected by a human programmer, the comparison type (Ty) in the branch and also identifies the values used in the comparison in the branch. Then in operation 507, the compiler injects computer program instructions into the final executable code or computer program to record the branch taken at the selected branch (when the branch is executed) and to record the comparison type and values used in the comparison type. The result of operation 507 can create one or more branch capture routines 205 which exist within the executable computer program, such as program 107 shown in FIG. 1. Then in operation 509, the compiler determines whether there is another branch to audit, and if so, loops back to operation 505 which continues for the next selected branch. If no further branches have been designated for auditing, then the compiler proceeds to operation 511 in which it injects one or more branch auditor routines, such as branch auditor routine 207 into the executable computer program. The result of processing shown in FIG. 5 produces, in one embodiment, the computer program shown in FIG. 2, and when that computer program executes, it will produce the obfuscated audit data stricture 209 in one embodiment.

Figure 6:
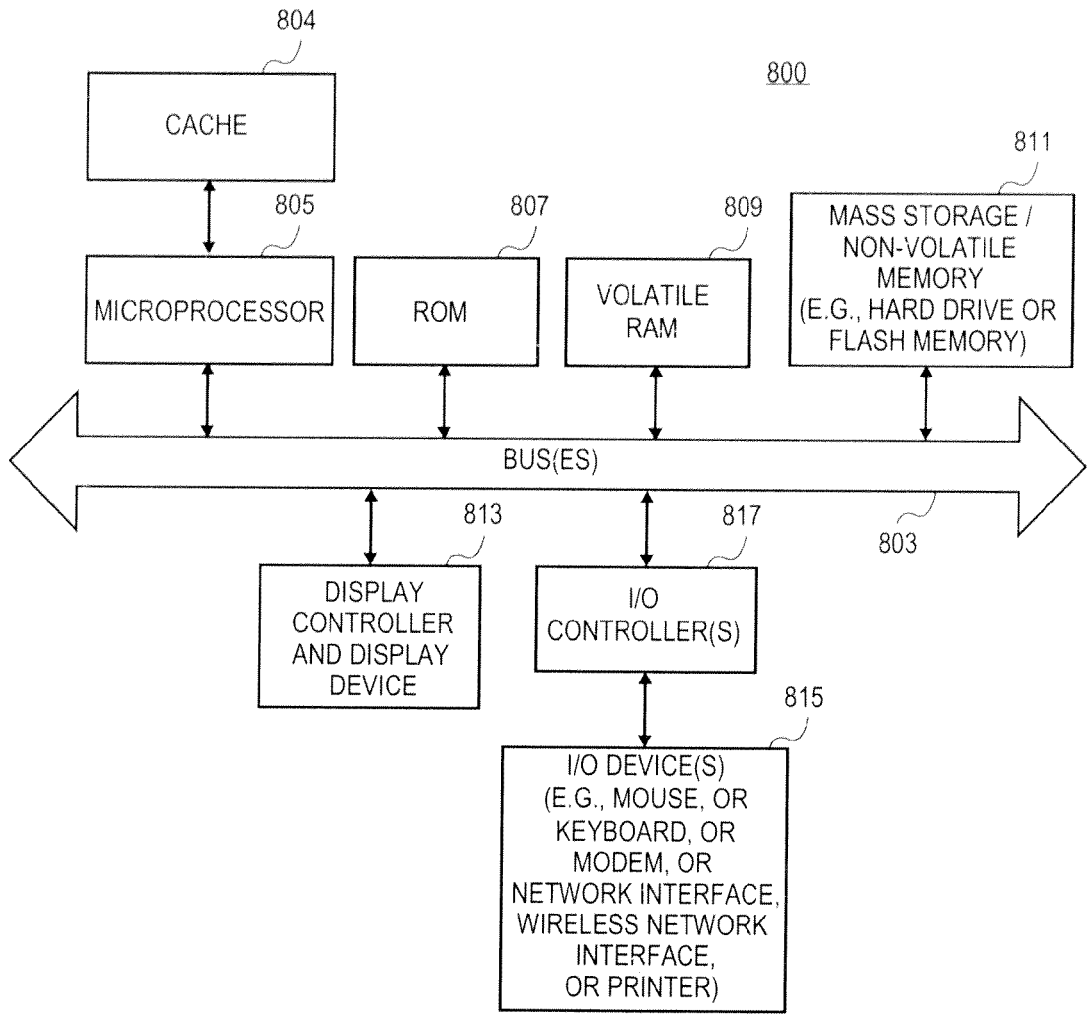
FIG. 6 is an example of a data processing system which can be used with one or more of the embodiments described herein.

FIG. 6 shows one example of a data processing system, which may be used with one embodiment of the present invention. Note that while FIG. 6 illustrates various components of a data processing system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 6, the computer system 800, which is a form of a data processing system, includes a bus 803 which is coupled to one or more microprocessor(s) 805 and a ROM (Read Only Memory) 807 and volatile RAM 809 and a non-volatile memory 811. The microprocessor 805 is coupled to optional cache 804. The microprocessor 805 may retrieve the stored instructions from one or more of the memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory. The system 800 can be a system that executes the software which includes the compiler injected instructions that provide branch auditing or system 800 can be a system that runs a compiler that injects the branch auditing software.

The mass storage 811 is typically a magnetic hard drive or a magnetic optical derive or an optical drive or a DVD RAM or a flash memory or other types of memory system which maintain data (e.g., large amounts of data) even after power is removed from the system. Typically the mass storage 811 will also be a random access memory although this is not required. While FIG. 6 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium containing executable program instructions which when executed by a data processing system cause the data processing system to perform a method comprising:

selecting, by an executing computer program, a path at a branch in a control flow of the executing computer program, the branch having been selected for auditing by instructions inserted into the computer program;

in response to the selecting of the path, executing compiler injected instructions in the executing computer program to record the path taken at the branch and to record parameters associated with the branch;

storing the path taken at the branch and the parameters in an audit data structure;

determining whether the path taken was valid given the stored path taken and the parameters in the audit data structure;

executing a branch auditor in response to the selecting of the path, the branch auditor obtaining access to the audit data structure to determine whether the path taken was valid, wherein the branch auditor decrypts data in the audit data structure to retrieve the parameters associated with the branch, and wherein the branch auditor performs an audit on the branch asynchronously relative to when the path at the branch was selected; and performing an operation to protect at least one of the data processing system or the executing computer program if the path taken was not valid.

2. The medium as in claim 1 wherein the audit data structure is obfuscated and wherein the parameters include a comparison type used at the branch and values used in the comparison type, and wherein the comparison type specifies an operation used at the branch and wherein a programming call specifically selects the branch.

3. The medium as in claim 1 wherein the audit data structure is obfuscated by encryption and wherein the branch is one of a plurality of branches and the other branches in the plurality of branches are not audited.

4. The medium as in claim 1 wherein a programming call selects the branch and the programming call is through an exposed Application Programming Interface (API) that causes the branch auditor to be injected into the computer program.

5. The medium as in claim 1 wherein the operation to protect is one of: (a) quitting or killing the computer program; (b) refusing to allow access to financial transactions; (c) erasing data that includes a cryptographic key; (d) restricting operation of the computer program to a predefined safe mode; or (e) present an error message or alert to a user.

6. The medium as in claim 1 wherein the branch auditor performs the audit on the branch at a random time after the path at the branch was selected.

7. A data processing system comprising:
a processing system having one or more processors;
a memory coupled to the processing system, the memory comprising executable instructions that, when executed by the processing system, perform a method comprising:
selecting, by an executing computer program, a path at a branch in a control flow of the executing computer program, the branch having been selected for auditing by instructions inserted into the computer program;
in response to the selecting of the path, executing compiler injected instructions in the executing computer program to record the path taken at the branch and to record parameters associated with the branch;
storing the path taken at the branch and the parameters in an audit data structure;
determining whether the path taken was valid given the stored path taken and the parameters in the audit data structure;
executing a branch auditor in response to the selecting of the path, the branch auditor obtaining access to the audit data structure to determine whether the path taken was valid, wherein the branch auditor decrypts data in the audit data structure to retrieve the parameters associated with the branch, and wherein the branch auditor performs an audit on the branch asynchronously relative to when the path at the branch was selected; and
performing an operation to protect at least one of the data processing system or the executing computer program if the path taken was not valid.

8. Wherein the branch auditor is configured to start the operation to protect the at least one of the data processing system or the executing computer program asynchronously relative to the time when the path taken occurred.

9. Wherein the instructions were injected by a compiler into the computer program in response to a programming call.

10. The system as in claim 7 wherein the audit data structure is obfuscated by encryption and wherein the parameters include a comparison type used at the branch and values used in the comparison type, and wherein the comparison type specifies an operation used at the branch and wherein the branch is one of a plurality of branches in the computer program and the other branches in the plurality of branches are not audited.

11. Wherein the instructions inserted into the computer program were inserted by a programming call through an exposed API (Application Programming Interface) that specifies parameters for the programming call.

12. Wherein the operation to protect at least one of the data processing system or the executing computer program comprises one of:
(a) quitting or killing the computer program;
(b) refusing to allow access to financial transactions;
(c) erasing data that includes a cryptographic key;
(d) restricting operation of the computer program to a predefined safe mode; or
(e) present an error message or alert to a user.

13. A computer implemented method comprising:
selecting, by an executing computer program, a path at a branch in a control flow of the executing computer program, the branch having been selected for auditing by instructions inserted into the computer program;
in response to the selecting of the path, executing compiler injected instructions in the executing computer program to record the path taken at the branch and to record parameters associated with the branch;
storing the path taken at the branch and the parameters in an audit data structure;
determining whether the path taken was valid given the stored path taken and the parameters in the audit data structure;
executing a branch auditor in response to the selecting of the path, the branch auditor obtaining access to the audit data structure to determine whether the path taken was valid, wherein the branch auditor decrypts data in the audit data structure to retrieve the parameters associated with the branch, and wherein the branch auditor performs an audit on the branch asynchronously relative to when the path at the branch was selected; and
performing an operation to protect at least one of the data processing system or the executing computer program if the path taken was not valid.

14. The method as in claim 13 wherein executing the branch auditor is performed by a programming call through an API to a library of software that creates a branch capture routine and a branch audit routine.

15. The method as in claim 13 wherein the recorded parameters include a comparison type used at the branch and the comparison type specifies an operation at the branch and wherein the branch is one of a plurality of branches and the other branches in the plurality of branches are not audited.

16. The method as in claim 13 wherein the operation to protect the at least one of the data processing system or the executing computer program comprises one of:
(a) quitting or killing the computer program;
(b) refusing to allow access to financial transactions;
(c) erasing data that includes a cryptographic key;
(d) restricting operation of the computer program to a predefined safe mode; or
(e) present an error message or alert to a user.

17. The method as in claim 16 wherein the compiler injected instructions in the executing computer program are configured to randomly in time invoke the operation to protect at least one of the data processing system or the executing computer program in response to determining the path taken was not valid.

* * * * *